UNITED STATES PATENT OFFICE.

IVAN LEVINSTEIN AND CARL MENSCHING, OF MANCHESTER, ENGLAND, ASSIGNORS TO LEVINSTEIN, LIMITED, OF MANCHESTER, ENGLAND.

BLUE POLYAZO DYE AND PROCESS OF MAKING SAME.

SPECIFICATION forming part of Letters Patent No. 722,860, dated March 17, 1903.

Application filed December 22, 1902. Serial No. 136,265. (No specimens.)

*To all whom it may concern:*

Be it known that we, IVAN LEVINSTEIN, a subject of the King of Great Britain and Ireland, and CARL MENSCHING, Ph. D., a subject of the German Emperor, both residing at Manchester, in the county of Lancaster, England, have invented new and useful Improvements in Blue Polyazo Dyestuffs and Process of Making Same, of which the following is a specification.

We have found that by heating $alpha_1 alpha_4$ naphthylamin sulfonic acid under suitable conditions with benzyl-chlorid a new benzylnaphthylamin sulfonic acid is produced and that by combining this acid with diazo derivatives of amidoazo compounds we obtain a very valuable series of coloring-matters which produce on wool shades which are brighter and bluer than those produced by the corresponding coloring-matters from the unbenzylated acid.

In a specification filed herewith, Serial No. 136,266, we have described and claimed the new benzylnaphthylamin sulfonic acid and the process for its manufacture to which this invention relates.

In the production of the new polyazo coloring-matters containing the new benzylated naphthylamin sulfonic acid we may, for example, proceed as follows: Ninety-three pounds of anilin are dissolved in the well-known manner by means of seventy-two pounds of sodium nitrite and the diazo solution is added to a solution of two hundred and forty-five pounds of Clève's $alpha_1 beta_3$ (or $alpha_1 beta_4$) naphthylamin sulfonate of sodium and two hundred and ten pounds of sodium acetate, the mixture being continually stirred until the combination is complete. The product is then made alkaline and isolated by the addition of salt and filtering, after which it is rediazotized in the usual manner with seventy-two pounds of sodium nitrite and four hundred pounds of hydrochloric acid, (18° Baumé.) The diazo compound is run into a neutral solution of three hundred and thirty-five pounds of $alpha_1 alpha_4$ benzylnaphthylamin sulfonate of sodium and three hundred pounds of sodium acetate and the mixture is continuously stirred for twelve hours, when the color is made alkaline, heated to 80° centigrade, and precipitated by the addition of salt. When filtered and dried, it forms a dark-black powder, which dissolves in water, forming a reddish-blue solution, and dyes wool in an acid-bath a brilliant blue.

In the example above given other amidoazo compounds may be substituted, and we are thus able to obtain different shades of blue coloring-matters.

What we claim as our invention, and desire to secure by Letters Patent, is—

1. The hereinbefore-described process for the production of polyazo coloring-matters which consists in combining the described new benzylated naphthylamin sulfonic acid with a diazo derivative of an amidoazo compound, substantially as set forth.

2. The new blue coloring-matters produced by combining the described benzylated naphthylamin sulfonic acid with a diazo derivative of an amidoazo compound, which coloring-matters form dark-black powders which dissolve in water forming blue solutions and which dye wool in an acid-bath in brilliant blue shades.

In testimony whereof we have signed our names to this specification in the presence of two subscribing witnesses.

IVAN LEVINSTEIN.
    CARL MENSCHING.

Witnesses:
 WILLIAM E. HEYS,
 GEORGE MOHL.